US012793899B2

(12) United States Patent
Lee et al.

(10) Patent No.: US 12,793,899 B2
(45) Date of Patent: Nov. 10, 2026

(54) MULTILAYER ELECTRONIC COMPONENT

(71) Applicant: SAMSUNG ELECTRO-MECHANICS CO., LTD., Suwon-si (KR)

(72) Inventors: Taek Jung Lee, Suwon-si (KR); Ok Nam Kim, Suwon-si (KR); Yoon A Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 145 days.

(21) Appl. No.: 18/968,501

(22) Filed: Dec. 4, 2024

(65) Prior Publication Data

US 2025/0218677 A1 Jul. 3, 2025

(30) Foreign Application Priority Data

Dec. 29, 2023 (KR) ........................ 10-2023-0196095

(51) Int. Cl.

| | |
|---|---|
| ***H01G 4/12*** | (2006.01) |
| ***H01G 4/008*** | (2006.01) |
| ***H01G 4/012*** | (2006.01) |
| ***H01G 4/224*** | (2006.01) |
| ***H01G 4/30*** | (2006.01) |

(52) U.S. Cl.

CPC ........... *H01G 4/1236* (2013.01); *H01G 4/008* (2013.01); *H01G 4/012* (2013.01); *H01G 4/224* (2013.01); *H01G 4/30* (2013.01)

(58) Field of Classification Search

CPC ...... H01G 4/1236; H01G 4/008; H01G 4/012; H01G 4/224; H01G 4/30

See application file for complete search history.

(56) References Cited

U.S. PATENT DOCUMENTS

2011/0194228 A1* 8/2011 Ishihara .............. C04B 35/4682 501/137
2014/0049876 A1* 2/2014 Yao .......................... H01G 4/30 361/321.4
2015/0114701 A1 4/2015 Chung et al.
2015/0279564 A1* 10/2015 Naito .................. H01G 4/1227 361/301.4
2023/0080684 A1* 3/2023 Kim ......................... H01G 4/30 361/321.2

FOREIGN PATENT DOCUMENTS

JP 2023-021929 A 2/2023
KR 10-1514559 B1 4/2015

* cited by examiner

*Primary Examiner* — Michael P McFadden
(74) *Attorney, Agent, or Firm* — Morgan, Lewis & Bockius LLP

(57) ABSTRACT

A multilayer electronic component includes a body including a dielectric layer and an internal electrode alternately disposed with the dielectric layer; and an external electrode disposed on the body; wherein the dielectric layer includes secondary phases including Zr and Y, and, among the secondary phases included in the dielectric layer, a numerical ratio of secondary phases contacting the internal electrode is 70% or more.

19 Claims, 6 Drawing Sheets

P

MULTILAYER ELECTRONIC COMPONENT

CROSS-REFERENCE TO RELATED APPLICATION(S)

This application claims benefit of priority to Korean Patent Application No. 10-2023-0196095 filed on Dec. 29, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip condenser mounted on the printed circuit boards of various types of electronic products, such as image display devices including a liquid crystal display (LCD), a plasma display panel (PDP), or the like, a computer, a smartphone, a mobile phone, or the like, and serving to charge or discharge electricity therein or therefrom. The MLCC may be used as a component of various electronic devices due to advantages thereof of decreasing a size, ensuring high capacitance, and being easy to mount.

Recently, as the market for MLCC for the IT field and an electric/electronics field has expanded, demand for products with high rated voltage and excellent reliability within the same capacitance range has increased. Among additive elements for dielectric composition of the MLCC, effects of fixed-valence acceptors, transition metal elements, which are variable-valence acceptors, and rare earth elements on reliability have already known, and conditions for good reliability are generally selected by optimizing a composition ratio of the additive elements for dielectric composition including them. Recently, it has been reported that, even with the same dielectric composition, there was a large difference in reliability depending on a microstructure, distribution and solubility of additive elements, and process conditions, and research thereon is actively being conducted.

SUMMARY

An aspect of the present disclosure is to provide a multilayer electronic component having excellent high-temperature reliability and moisture-resistance reliability.

An aspect of the present disclosure is to provide a multilayer electronic component having excellent insulation resistance.

The purposes of the present disclosure are not limited to the contents, and can be more easily understood in a process of explaining specific embodiments of the present disclosure.

According to an aspect of the present disclosure, a multilayer electronic component includes a body including a dielectric layer and an internal electrode alternately disposed with the dielectric layer; and an external electrode disposed on the body; wherein the dielectric layer includes secondary phases including Zr and Y, and, among the secondary phases included in the dielectric layer, a numerical ratio of first secondary phases that contact the internal electrode is 70% or more.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
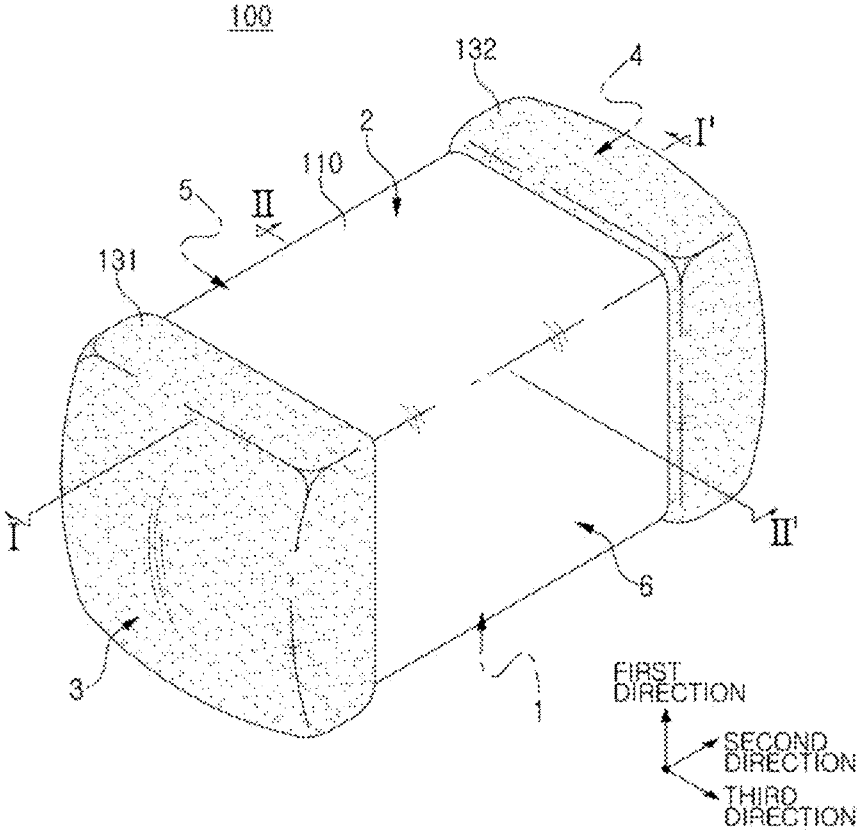
FIG. 1 is a perspective view schematically illustrating a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinarily skilled artisan. Therefore, shapes, sizes, and the like, of the elements in the drawings may be exaggerated for clarity of description, and the elements denoted by the same reference numerals in the drawings may be the same elements.

In addition, in order to clearly explain the present disclosure in the drawings, portions not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, a first direction may be defined as a thickness (T) direction, a second direction may be defined as a length (L) direction, and a third direction may be defined as a width (W) direction.

Multilayer Electronic Component

FIG. 1 is a perspective view schematically illustrating a multilayer electronic component according to an embodiment of the present disclosure.

Figure 2:
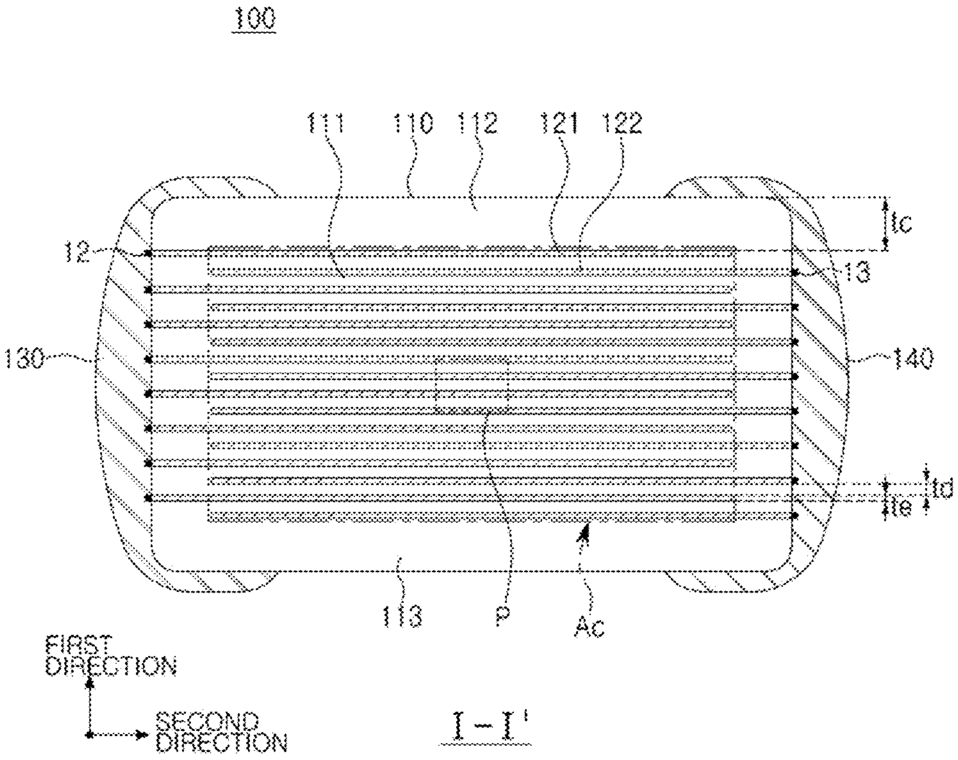
FIG. 2 is a cross-sectional view schematically illustrating a cross-section of FIG. 1, taken along line I-I'.

FIG. 2 is a cross-sectional view schematically illustrating a cross-section of FIG. 1, taken along line I-I'.

Figure 3:
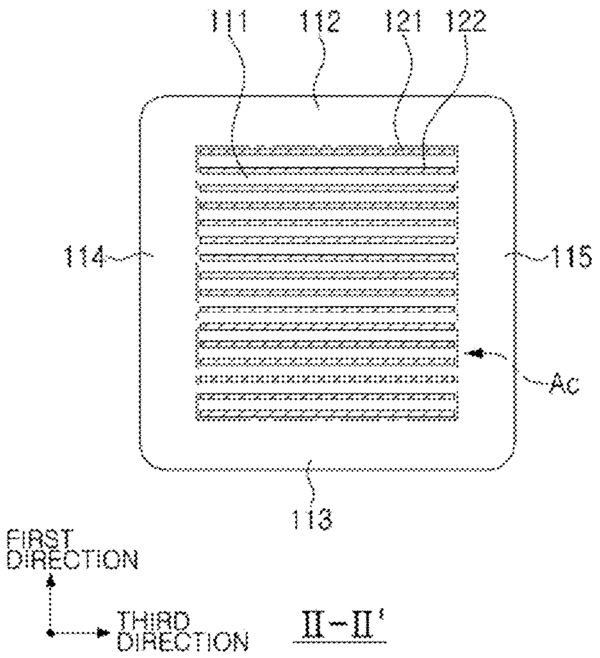
FIG. 3 is a cross-sectional view schematically illustrating a cross-section of FIG. 1, taken along line II-II'.

FIG. 3 is a cross-sectional view schematically illustrating a cross-section of FIG. 1, taken along line II-II'.

Figure 4:
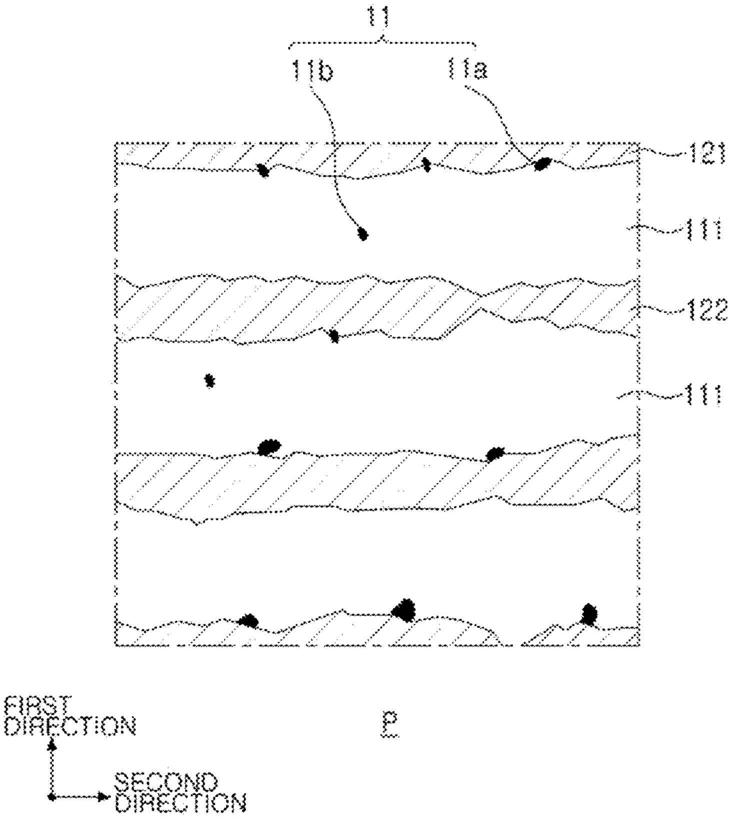
FIG. 4 is an enlarged view schematically illustrating a P region of FIG. 2.

FIG. 4 is an enlarged view schematically illustrating a P region of FIG. 2.

Figure 5:
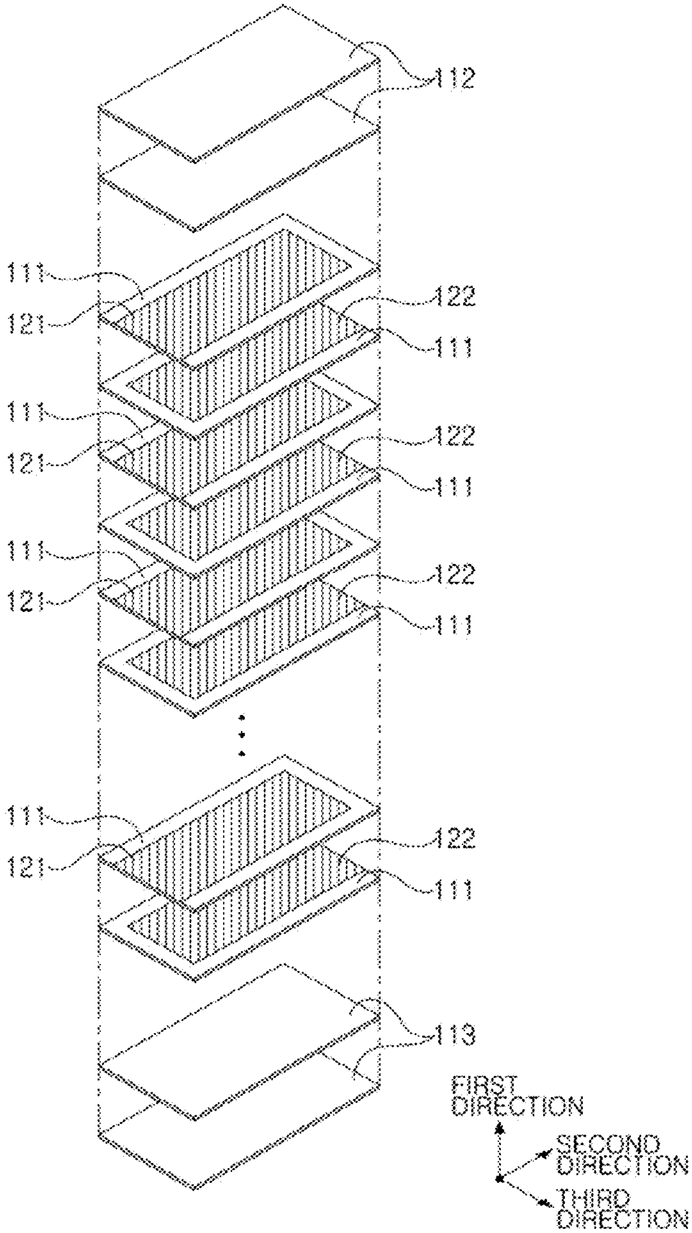
FIG. 5 is an exploded perspective view schematically illustrating the body of FIG. 1.

FIG. 5 is an exploded perspective view schematically illustrating the body of FIG. 1.

Hereinafter, a multilayer electronic component 100 according to an embodiment of the present disclosure will be described in detail with reference to FIGS. 1 to 5. In addition, a multilayer ceramic capacitor will be described as an example of the multilayer electronic component, but the present disclosure is not limited thereto, and may be applied to various multilayer electronic components, such as an inductor, a piezoelectric element, a varistor, a thermistor, or the like.

A multilayer electronic component 100 according to an embodiment of the present disclosure may include a body 110 including a dielectric layer 111 and an internal electrode 121 and 122 alternately disposed with the dielectric layer 111, and an external electrode 130 and 140 disposed on the body 110, wherein the dielectric layer 111 may include secondary phases 11 including Zr and Y, and a numerical ratio of secondary phases 11*a* contacting the internal electrode 121 and 122, among the secondary phases 11 included in the dielectric layer 111, may be 70% or more.

There may be no particular limitation on a specific shape of the body 110, but as illustrated, the body 110 may be formed in a hexahedral shape or a similar shape. Due to shrinkage of ceramic powders included in the body during the sintering process or polishing of a corner, the body 110 may not have an entirely straight hexahedral shape, but may have a substantially hexahedral shape.

The body 110 may have a first surface and a second surface 1 and 2 opposing each other in the first direction, a third surface and a fourth surface 3 and 4 connected to the first surface and the second surface 1 and 2 and opposing each other in the second direction, and a fifth surface and a sixth surface 5 and 6 connected to the first to fourth surfaces 1, 2, 3, and 4 and opposing each other in the third direction. An arithmetic mean roughness Ra of a surface of at least one of the first to sixth surfaces 1, 2, 3, 4, 5, and 6 of the body 110 may be 0.2 um to 1 um.

The body 110 may include the dielectric layer 111 and the internal electrode 121 and 122 alternately disposed with the dielectric layer 111. A plurality of dielectric layers 111 forming the body 110 may be in a sintered state, and a boundary between adjacent dielectric layers 111 may be integrated to such an extent that it may be difficult to identify the same without using a scanning electron microscope (SEM).

The dielectric layer 111 may include a main component having a perovskite structure represented by general formula $ABO_3$. An element of the A site may include, for example, one or more of Ca and Sr. An element of the B site may include Zr. In addition, the element of the B site may further include Ti. The dielectric layer 111 may include, for example, the main component represented by $(Ca_{1-x}Sr_x)(Zr_{1-y}Ti_y)O_3$ ($0<x\leq 0.5$, $0<y\leq 0.5$) (hereinafter, referred to as CSZT-based).

An average thickness td of the dielectric layer 111 is not particularly limited. The average thickness td of the dielectric layer 111 may be, for example, 0.1 μm to 10 μm, 0.1 μm to 5 μm, 0.1 μm to 2 μm, or 0.1 μm to 0.4 μm.

The dielectric layer 111 may be formed using a dielectric material represented by $ABO_3$, and may thus include a dielectric microstructure after sintering. The dielectric microstructure may include a plurality of dielectric grains, grain boundaries disposed between adjacent dielectric grains among the plurality of dielectric grains, and triple points disposed at points at which three or more dielectric grains among the plurality of dielectric grains are in contact, and may include a plurality of each thereof.

Also, although not illustrated, at least one of the plurality of dielectric grains may have a core-shell structure including a core and a shell surrounding at least a portion of the core, but the present disclosure is not limited thereto.

The dielectric layer 111 may be formed by preparing a ceramic slurry containing powders of the main component, an organic solvent, and a binder, applying and drying the slurry on a carrier film to prepare a ceramic green sheet, and then sintering the ceramic green sheet. The organic solvent may be ethanol/toluene or the like, and the binder may be polyvinyl butyral or the like, but the present disclosure is not limited thereto.

The internal electrode 121 and 122 may include, for example, a first internal electrode 121 and a second internal electrode 122, alternately disposed in the first direction, with the dielectric layer 111 therebetween. For example, the internal electrode 121 and the second internal first electrode 122, which may be a pair of electrodes having different polarities, may be disposed to oppose each other with a dielectric layer 111 therebetween. The first internal electrode 121 and the second internal electrode 122 may be electrically separated from each other by the dielectric layer 111 disposed therebetween.

The first internal electrode 121 may be spaced apart from the fourth surface 4 and connected to a first external electrode 130 on the third surface 3. The second internal electrode 122 may be spaced apart from the third surface 3 and connected to a second external electrode 140 on the fourth surface 4.

A conductive metal included in the internal electrode 121 and 122 may be at least one of Ni, Cu, Pd, Ag, Au, Pt, Sn, W, Ti, or alloys thereof, and more preferably may include Ni, but the present disclosure is not limited thereto.

An average thickness the of the internal electrode 121 and 122 is not particularly limited. The average thickness the of the internal electrode 121 and 122 may be, for example, 0.1 μm to 3.0 μm, 0.1 μm to 1.0 μm, or 0.1 μm to 0.4 μm.

The internal electrode 121 and 122 may be formed by printing a conductive paste for the internal electrode including a metal powder, an organic solvent, a binder, or the like, on a ceramic green sheet to a predetermined thickness to form an internal electrode pattern, and sintering the internal electrode pattern. A method of printing the conductive paste for the internal electrode may use a screen printing method or a gravure printing method, but the present disclosure is not limited thereto.

The average thickness td of the dielectric layer 111 and the average thickness the of the internal electrode 121 and 122 mean an average thickness of the dielectric layer 111 and an average thickness of the internal electrode 121 and 122 in the first direction, respectively. The average thickness td of the dielectric layer 111 and the average thickness the of the internal electrode 121 and 122 may be measured by scanning cross-sections of the body 110 in the first and second directions with a scanning electron microscope (SEM) at 10,000 magnification. More specifically, the average thickness td of the dielectric layer 111 may be determined by measuring thicknesses at multiple points of one dielectric layer 111, for example, at thirty equally spaced points in the second direction, and then taking an average value. In addition, the average thickness the of the internal electrode 121 and 122 may be determined by measuring thicknesses at multiple points of one internal electrode 121 and 122, for example, at thirty equally spaced points in the second direction, and then taking an average value. The thirty equally spaced points may be designated in a capacitance formation portion Ac. When the value of the average thickness is determined by using measurements of average values to ten dielectric layers 111 and ten internal electrodes 121 and 122, and measuring the average value, the average thickness td of the dielectric layer 111 and the average thickness the of the internal electrode 121 and 122 may be more generalized.

The body 110 may include a capacitance formation portion Ac disposed in the body 110 and including the dielectric layer 111 and the first and second internal electrodes 121 and 122 alternately disposed, to form capacitance, and a cover portion 112 and 113 disposed on opposite surfaces of the capacitance forming portion Ac in the first direction. The cover portion 112 and 113 may have a configuration, similar to a configuration of the dielectric layer 111 except that they do not include the internal electrode.

An average thickness tc of the cover portion 112 and 113 is not particularly limited. The average thickness tc of the cover portion 112 and 113 may be, for example, 100 μm or less, 30 μm or less, or 20 μm or less. The average thickness tc of the cover portion 112 and 113 may be, for example, 5 μm or more. In this case, the average thickness tc of the cover portion 112 and 113 means an average thickness of each of a first cover portion 112 and a second cover portion 113.

The average thickness tc of the cover portion 112 and 113 may mean an average thickness of the cover portion 112 and 113 in the first direction, and may be an average value of dimensions in the first direction, measured at five equally spaced points in the second direction, in a cross section of the body 110 in the first and second directions, cut from a center of the body 110 in the third direction.

The body 110 may include margin portions 114 and 115 respectively disposed on both surfaces of the capacitance formation portion Ac in the third direction. For example, the margin portions 114 and 115 may mean regions between both ends of the internal electrode 121 and 122 and a boundary surface of the body 110 in a cross section of the body 110 in the first and third directions. The margin portions 114 and 115 may have a configuration similar to that of the dielectric layer 111 except that they do not include the internal electrode 121 and 122.

The margin portions 114 and 115 may be prepared by applying and sintering a conductive paste for the internal electrode to a ceramic green sheet, except for regions in which the margin portions are formed. Alternatively, to suppress occurrence of a step difference caused by the internal electrode 121 and 122, an internal electrode pattern may be exposed on both surfaces of a chip before sintering opposing in the third direction, and then a sheet for forming the margin portion may be attached to both surfaces of the chip before sintering opposing in the third direction, and then sintered to form the margin portions 114 and 115.

An average thickness of the margin portion 114 and 115 is not particularly limited. The average thickness of the margin portion 114 and 115 may be, for example, 100 μm or less, 20 μm or less, or 15 μm or less. The average thickness of the margin portion 114 and 115 may be, for example, 2 μm or more. In this case, the average thickness of the margin portion 114 and 115 means an average thickness of each of a first margin portion 114 and a second margin portion 115.

The average thickness of the margin portion 114 and 115 may mean an average thickness of the margin portion 114 and 115 in the third direction, and may be an average value of dimensions in the third direction, measured at five equally spaced points in the first direction, in a cross section of the body 110 in the first and third directions.

The external electrode 130 and 140 may include a first external electrode 130 disposed on the third surface 3 and connected to the first internal electrode 121, and a second external electrode 140 disposed on the fourth surface 4 and connected to the second internal electrode 122. The first external electrode 130 may extend from the third surface 3 to a portion of the first surface 1, a portion of the second surface 2, a portion of the fifth surface 5, and a portion of the sixth surface 6, and the second external electrode 140 may extend from the fourth surface 4 to a portion of the first surface 1, a portion of the second surface 2, a portion of the fifth surface 5, and a portion of the sixth surface 6.

A type or a shape of the external electrode is not particularly limited, and may have a multilayer structure. For example, the external electrode may include a base electrode layer contacting the internal electrode 121 and 122, and a plating layer disposed on the base electrode layer.

The base electrode layer may be a sintered electrode including metal and glass. The metal included in the base electrode layer may include Cu, Ni, Pd, Pt, Au, Ag, Pb, and/or an alloy including them, but the present disclosure is not limited thereto. The glass included in the base electrode layer may include an oxide of one or more of Ba, Ca, Zn, Al, B, and Si, but the present disclosure is not limited thereto.

The base electrode layer may be formed by dipping the body 110 into a conductive paste including a metal powder, a glass frit, a binder, an organic solvent, or the like, and then sintering the conductive paste at a temperature of 500° C. to 900° C.

The base electrode layer may be formed as only a first layer including metal and glass, but the present disclosure is not limited thereto, and the base electrode layer may have a multilayer structure. For example, the base electrode layer may include a first layer including metal and glass, and a second layer disposed on the first layer and including metal and a resin.

The metal included in the second layer may include one or more of spherical particles and flake-shaped particles. In this case, the spherical particles may also include shapes other than perfectly spherical, for example, shapes having a length ratio of a major axis to a minor axis (major axis/minor axis) of 1.45 or less. The flake-shaped particles refer to particles having a flat and elongated shape, and is not particularly limited, for example, may have a length ratio of the major axis to the minor axis (major axis/minor axis) of 1.95 or more.

The metal included in the second layer may include, for example, Cu, Ni, Pd, Pt, Au, Ag, Pb, Sn, and/or an alloy including them. The resin included in the second layer may include, for example, one or more of an epoxy resin, an acrylic resin, and ethyl cellulose.

When the base electrode layer include a first layer including metal and glass and a second layer including metal and a resin, the second layer may be formed by applying a conductive resin composition including metal powders, a resin, a binder, an organic solvent, or the like on the first layer, and then performing a curing heat treatment at a temperature of 250° C. to 550° C.

The plating layer may improve mounting characteristics. The plating layer may include, for example, Ni, Sn, Pd, and/or an alloy including them, and may be formed of a plurality of layers. The plating layer may be, for example, a Ni plating layer or a Sn plating layer, and may be in a form in which Ni plating layer and Sn plating layer are sequentially formed. In addition, the plating layer may include a plurality of Ni plating layers and/or a plurality of Sn plating layers.

In an embodiment, the multilayer electronic component 100 may include a connection electrode 12 and 13 disposed on an end of the internal electrode 121 and 122. A first connection electrode 12 may be disposed on an end of the first internal electrode 121 to connect the first internal electrode 121 and the first external electrode 130, and the second connection electrode 13 may be disposed on an end of the second internal electrode 122 to connect the second internal electrode 122 and the second external electrode 140. The connection electrode 12 and 13 may contact the internal electrode 121 and 122 on an inside of the body 110 and may contact the external electrode 130 and 140 on an outside of the body 110.

The connection electrode 12 and 13 may include, for example, one or more of Ni, Cu, and Pd. The connection electrode 12 and 13 may be formed through an electrolytic plating method and/or an electroless plating method, but the present disclosure is not limited thereto.

Although the drawings describe a structure in which the multilayer electronic component 100 has two external electrodes 130 and 140, it is not limited thereto, and the number, shapes, or the like of the external electrodes 130 and 140 may be changed, depending on a shape of the internal electrode 121 and 122 or other purposes.

A size of the multilayer electronic component 100 is not particularly limited. For example, a length of the multilayer electronic component 100 in the second direction may be 0.15 mm to 3.50 mm, a width of the multilayer electronic component 100 in the third direction may be 0.05 mm to 1.65 mm, and a thickness of the multilayer electronic component 100 in the first direction may be 0.05 mm to 2.0 mm.

The dielectric layer 111 may include a secondary phase 11 including Zr and Y. Referring to FIG. 4, among secondary phases 11 included in the dielectric layer 111, at least some secondary phases **11*a* may be disposed to contact the internal electrode 121 and 122, and remaining secondary phases 11*b* may be disposed to be spaced apart from the internal electrode 121 and 122**.

In this specification, the term "secondary phase" may mean a particle having a different composition or crystal lattice from perovskite-based ($ABO_3$) dielectric particles or segregation, and may mean a collection of components not dissolved in dielectric grains, but is not particularly limited thereto.

For example, the secondary phase may mean a collection of elements not dissolved or substituted in a crystal lattice structure of grains of a CSZT-based dielectric material. For example, the secondary phases 11 of the multilayer electronic component 100 according to an embodiment of the present disclosure may mean a collection of elements including Zr and Y that may not be dissolved or substituted in the crystal lattice structure of the dielectric grains, which may be CSZT-based main components.

According to an embodiment of the present disclosure, a numerical ratio of secondary phases **11*a* contacting the internal electrode 121 and 122, among the secondary phases 11 included in the dielectric layer 111, may be 70% or more. The secondary phases 11 including Zr and Y may be a type of low-resistance phase, and when the secondary phases 11 are disposed spaced apart from the internal electrode 121 and 122, probability of forming a conductive path electrically connecting adjacent internal electrode 121 and 122 may increase, and as a result, there may be a concern that insulation resistance of the multilayer electronic component 100** is lowered or a short circuit failure occurs.

Therefore, the numerical ratio of the secondary phases **11*a* contacting the internal electrode 121 and 122, among the secondary phases 11 included in the dielectric layer 111, may be 70% or more, to improve high temperature reliability and moisture resistance reliability of the multilayer electronic component 100, and to prevent the insulation resistance of the multilayer electronic component 100** from being deteriorated.

An upper limit of the numerical ratio of the secondary phases **11*a* contacting the internal electrode 121 and 122, among the secondary phases 11 included in the dielectric layer 111**, is not particularly limited, but the numerical ratio may be 95% or less to prevent other characteristics from being deteriorated.

More specifically, with regard to a method for measuring the numerical ratio, when Zr and Y are mapped from a cross-section of the capacitance formation portion Ac in the first and second directions, cut from a central portion of the body 110 in the third direction using an EDS mode of an SEM, a TEM, or a STEM, a collective region of Zr and Y observed in the dielectric layer 111 may be defined as the secondary phases 11. In this case, among the secondary phases 11, a secondary phase having a contact length of 0.05 μm or more with the internal electrode 121 and 122 may be defined as the secondary phases **11*a* contacting the internal electrode 121 and 122. In this case, a ratio of the number of secondary phases 11*a* contacting the internal electrode 121 and 122 relative to a total number of secondary phases 11** observed in the cross-section may be defined as the numerical ratio. Other methods and/or tools appreciated by one of ordinary skill in the art, even if not described in the present disclosure, may also be used.

It is not necessary to satisfy that the numerical ratio is 70% or more in all regions of the capacitance formation portion Ac, and when the numerical ratio of the secondary phases **11*a* contacting the internal electrode 121 and 122, among the secondary phases 11 existing in at least one 10 μm×10 μm region of the capacitance formation portion Ac, is 70% or more, reliability and insulation resistance of the multilayer electronic component 100 may be improved. For example, in an embodiment, the capacitance formation portion Ac may include a 10 μm×10 μm region having the numerical ratio of 70% or more. The 10 μm×10 μm region may be located, for example, in a central portion of cross-sections in the first and second directions (for example, a P region of FIG. 2), cut from a center of the body 110 the third direction. It may be more preferable that the numerical ratio of the secondary phases 11*a* contacting the internal electrode 121 and 122, among the secondary phases 11** existing in an arbitrary 10 μm×10 μm region in the capacitance formation portion Ac is 70% or more.

In an embodiment, the number of secondary phases **11*a* contacting the internal electrode 121 and 122 in the 10 μm×10 μm region may be 5 or more. When the number of secondary phases 11*a* contacting the internal electrode 121 and 122 in the 10 μm×10 μm region is less than 5, a reliability improvement effect of the present disclosure may be minimal. An upper limit of the number of secondary phases 11*a* contacting the internal electrode 121 and 122** in the 10 μm×10 μm region is not particularly limited, but may be 100 or less to prevent other characteristics from being deteriorated.

In an embodiment, a ratio of an area occupied by the secondary phases 11 to a total area of the dielectric layer 111 in the 10 μm×10 μm region may be 5% or less. When the ratio of the area occupied by the secondary phases 11 to the total area of the dielectric layer 111 in the 10 μm×10 μm region exceeds 5%, side effects such as a decrease in insulation resistance of the multilayer electronic component 100 or the like may occur. A lower limit of the ratio of the area occupied by the secondary phases 11 to the total area of the dielectric layer 111 in the 10 μm×10 μm region is not particularly limited, but may be more than 0% or 1.5% or more.

In this case, an area of the secondary phases 11 may be measured after removing noises other than the secondary phases 11 including Zr and Y by applying a program filter function of an image analysis program of 'Image Pro Plus', but is not particularly limited thereto.

In an embodiment, the cover portion 112 and 113 may include the secondary phase including Zr and Y. In addition, the cover portion 112 and 113 may include the secondary phase, to more effectively improve high temperature reliability and moisture resistance reliability of the multilayer electronic component 100.

In an embodiment, a ratio of an area occupied by the secondary phase in the cover portion 112 and 113 may be higher than a ratio of an area occupied by the secondary phase in the dielectric layer 111. Unlike the capacitance formation portion Ac, since the cover portion 112 and 113 may not include the internal electrode 121 and 122, probability of occurrence of a problem of conductive path formation by the secondary phase described above may be relatively low. Therefore, when the ratio of the area occupied by the secondary phase in the cover portion 112 and 113 is higher than the ratio of the area occupied by the secondary phase in the dielectric layer 111, high temperature reliability and moisture resistance reliability of the multilayer electronic component 100 may be effectively improved without significantly affecting insulation resistance of the multilayer electronic component 100.

A composition of the secondary phases 11 including Zr and Y may be different from a composition of the CSZT-based dielectric grains. For example, $S_{Zr}>R_{Zr}$ and $S_Y>R_Y$ may be satisfied where an atomic percentage of Zr included in the secondary phases 11 is $S_{Zr}$, an atomic percentage of Y included in the secondary phases 11 is $S_Y$, an atomic percentage of Zr included in a remaining region of the dielectric layer 111 excluding the secondary phases 11 is $R_{Zr}$, and an atomic percentage of Y included in the remaining region of the dielectric layer 111 excluding the secondary phases 11 is $R_Y$.

In this case, $S_{Zr}$ and $S_Y$ may mean an average value of atomic percentages of each of the elements measured at 3 or more points of the same secondary phases 11, and $R_{Zr}$ and $R_Y$ may mean an average value of atomic percentages of each of the elements measured at 5 or more points of the same dielectric grain, but is not particularly limited thereto.

In an embodiment, the $S_{Zr}$ may be 0.1 at % or more and 50 at % or less, and the $S_Y$ may be 0.1 at % or more and 10 at % or less. reliability and insulation resistance improvement effects of the present disclosure may thus be more remarkable by satisfying 0.1 at %≤$S_{Zr}$≤50 at % and 0.1 at %≤$S_Y$≤10 at %.

As an example of a more specific method for measuring amounts of each of the elements included in secondary phases 11 and the remaining region excluding the secondary phases 11 among the dielectric layer 111, the elements of each of the regions may be analyzed using SEM-EDS, TEM-EDS, or STEM-EDS. First, a thinned analysis sample may be prepared using a focused ion beam (FIB) device in a region including the dielectric layer, among cross-sections of the body after sintering. Then, the damage layer on the surface of the thinned sample may be removed using Ar ion milling, and then each of the elements may be mapped in an image obtained using STEM-EDS or the like, to perform a qualitative/quantitative analysis. In this case, a graph for the qualitative/quantitative analysis of each of the elements may be expressed by converting the same into a mass fraction (wt %), an atomic percentage (at %), or a mole fraction (mol %) of each of the elements. Other methods and/or tools appreciated by one of ordinary skill in the art, even if not described in the present disclosure, may also be used.

An average diameter of the plurality of dielectric grains included in the dielectric layer 111 may be 300 nm or more and 500 nm or less. This may correspond to results of sintering the main component powder having a size of 70 nm to 150 nm, but is not particularly limited thereto. An average diameter of the plurality of dielectric grains included in the dielectric layer 111 may be satisfied to have 300 nm or more and 500 nm or less, high temperature and moisture resistance reliability and insulation resistance characteristics may be further improved. In an embodiment, a standard deviation of diameters of the plurality of dielectric grains included in the dielectric layer 111 may be 200 nm or less. Dispersion of the diameters of the dielectric grains may be improved by satisfying the standard deviation of the diameters of the plurality of dielectric grains included in the dielectric layer 111 to have 200 nm or less, the multilayer electronic component 100 may satisfy X7R temperature characteristics (a change rate of electrostatic capacitance at −55° C. to 125° C. may be −15% or more and 15% or less, based on an electrostatic capacitance value at 25° C.). For example, a maximum value of the diameters of the plurality of dielectric grains included in the dielectric layer 111 may be 1000 nm or less.

The average diameter and the standard deviation of the plurality of dielectric grains included in the dielectric layer 111 may correspond to an average and a standard deviation of the diameters of the plurality of dielectric grains included in the dielectric layer 111, for example, based on a 10 μm×10 μm region of a cross-section in the first and second directions, cut from a central portion of the body 110 in the third direction. In this case, the diameter of the dielectric grain may mean a size of an arbitrary straight line passing through a center of the dielectric grain, and more specifically, may mean a size of a straight line in the first direction passing through the center of the dielectric grain, but is not particularly limited thereto. The diameter may be measured with a scanning electron microscope (SEM) at 10,000. The average diameter may be an average of diameters of the plurality of dielectric grains (e.g., 5, 10, or 30 or more). Other methods and/or tools appreciated by one of ordinary skill in the art, even if not described in the present disclosure, may also be used.

As described above, the dielectric layer 111 may include a main component having a perovskite structure represented by general formula $ABO_3$, for example, a CSZT-based main component and a subcomponent, and more specifically, may further include the following first to fourth subcomponents.

a) First Subcomponent

The dielectric layer 111 may further include a first subcomponent element, and the first subcomponent element may be a rare earth element. The rare earth element may be one or more of Y, Dy, Tb, Gd, Ce, Nd, La, and Yb, and more preferably, the first subcomponent element may be Y.

The rare earth element, which may be the first subcomponent element, may play a role in improving a high-temperature accelerated lifespan, and may play a role in improving reliability. The first subcomponent may be one or more of an oxide and a carbonate of the rare earth element, and may be added together with a main component raw material before sintering.

In this case, the number of moles of the first subcomponent element relative to 100 moles of Zr included in the dielectric grains of the dielectric layer 111 may be 0.05 moles or more and 3.5 moles or less. When the number of moles of the first subcomponent element relative to 100 moles of Zr included in the dielectric grains of the dielectric layer 111 is less than 0.05 moles, there may be a concern that a high-temperature accelerated lifespan is reduced, and when the number of moles of the first subcomponent element relative to 100 moles of Zr included in the dielectric grains of the dielectric layer 111 is more than 3.5 moles, insulation resistance (IR) may be reduced or a high-temperature accelerated lifespan may be reduced due to n-type semiconductorization of the dielectric layer.

b) Second Subcomponent

The dielectric layer 111 may further include a second subcomponent element, and the second subcomponent element may be an atomic variable acceptor element, and the atomic variable acceptor element may be one or more of Mn, V, Cr, Fe, Co, Ni, Cu, Co, and Zn.

The second subcomponent may be one or more of an oxide and a carbonate of the atomic variable acceptor element, and may be added together with a main component raw material before sintering. The atomic variable acceptor element, which may be the second subcomponent element, may play a role in lowering a sintering temperature, and improving dielectric properties and a high-temperature accelerated lifespan.

In this case, the number of moles of the second subcomponent element relative to 100 moles of Zr included in the dielectric grains of the dielectric layer 111 may be 0.1 mole or more and 0.8 mole or less, and when a plurality of second subcomponent elements are added, a total amount thereof may be defined as the number of moles of the second subcomponent element.

When the number of moles of the second subcomponent element relative to 100 moles of Zr included in the dielectric grains of the dielectric layer 111 is less than 0.1 moles, there may be a concern that insulation resistance is reduced, and when the number of moles of the second subcomponent element relative to 100 moles of Zr included in the dielectric grains of the dielectric layer 111 is more than 0.8 moles, there may be a concern that a DC-bias change rate is reduced.

c) Third Subcomponent

The dielectric layer 111 may further include a third subcomponent element, and the third subcomponent element may be Mg.

The third subcomponent may be one or more of an oxide and a carbonate of Mg, and may be added together with a main component raw before material sintering. The third subcomponent element, Mg, may provide reduction resistance, and may play a role in increasing a reliability class (RC) value. In this case, the RC value may mean reliability according to a temperature, reliability at a high temperature, reliability at a high voltage, life evaluation, or the like.

In this case, the number of moles of the third subcomponent element relative to 100 moles of Zr included in the dielectric grains of the dielectric layer 111 may be greater than 0 moles and less than 1 mole.

When the third subcomponent element is not added to the dielectric layer 111, for example, when the number of moles of the third subcomponent element relative to 100 moles of Zr included in the dielectric grains of the dielectric layer 111 is 0 mole, there may be a concern that reliability is reduced, and when the number of moles of the third subcomponent element relative to 100 moles of Zr included in the dielectric grains of the dielectric layer 111 is more than 1 mole, there may be a concern that X7R temperature characteristics are not satisfied.

d) Fourth Subcomponent

The dielectric layer 111 may further include a fourth subcomponent element, and the fourth subcomponent element may be Si.

The fourth subcomponent may be at least one of an oxide of Si, a carbonate of Si, or a glass containing Si, and may be added together with a main component raw material before sintering. The fourth subcomponent element, Si, may play a role in improving insulation resistance or a high-temperature accelerated lifespan.

In this case, the number of moles of the fourth subcomponent element relative to 100 moles of Zr included in the dielectric grains of the dielectric layer 111 may be 0.1 moles or more and 2.0 moles or less.

When the number of moles of the fourth subcomponent element relative to 100 moles of Zr included in the dielectric grains of the dielectric layer 111 is less than 0.1 moles, there may be a concern that insulation resistance may be reduced or a high-temperature accelerated lifespan may be reduced, and when the number of moles of the fourth subcomponent element relative to 100 moles of Zr included in the dielectric grains of the dielectric layer 111 is more than 2.0 moles, there may be a concern that a room temperature dielectric constant may be reduced.

Figure 6:
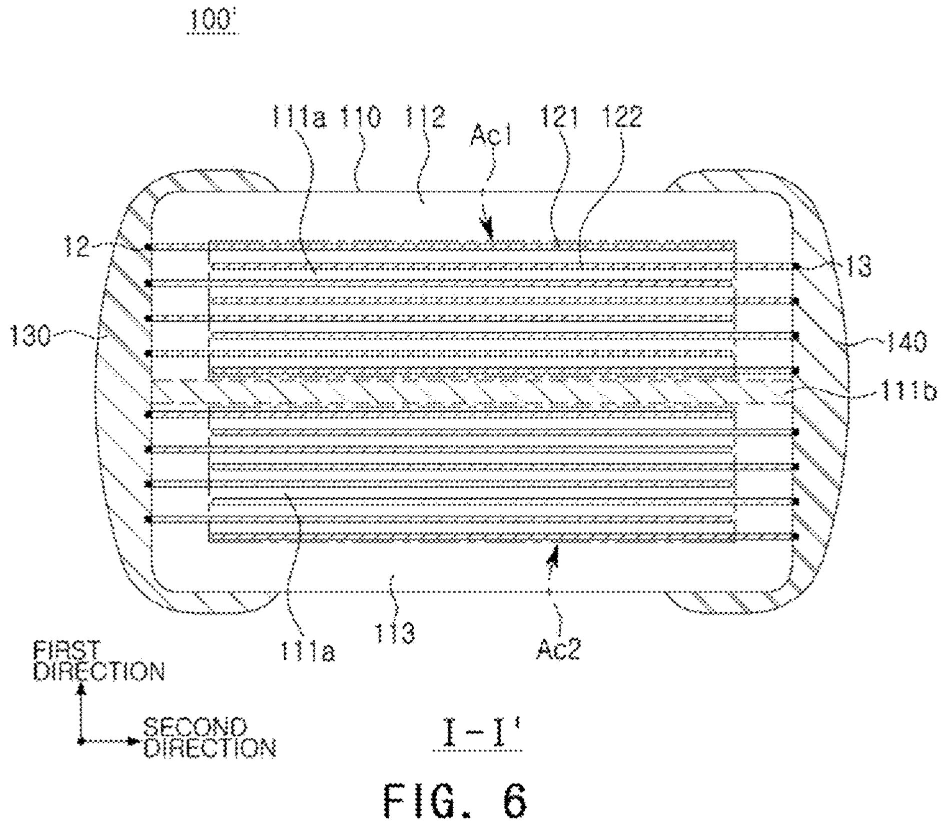
FIG. 6 is a cross-sectional view schematically illustrating a multilayer electronic component according to another embodiment of the present disclosure, and is a view corresponding to FIG. 2.

FIG. 6 is a cross-sectional view schematically illustrating a multilayer electronic component 100' according to another embodiment of the present disclosure, and is a view corresponding to FIG. 2.

Hereinafter, a multilayer electronic component 100' according to another embodiment of the present disclosure will be described with reference to FIG. 6. The same/similar reference numerals may be used for configurations identical/similar to the configuration of the multilayer electronic component 100 described in FIG. 2, and duplicate descriptions will be omitted.

A body 110 of a multilayer electronic component 100' according to an embodiment of the present disclosure may include a plurality of capacitance formation portions Ac1 and Ac2 in which a dielectric layer 111*a* and an internal electrode 121 and 122 may be alternately disposed in the first direction, and a buffer layer 111*b* disposed between adjacent capacitance formation portions Ac1 and Ac2. The buffer layer 111*b* may be thicker than the dielectric layer 111*a*. The thickness of the buffer layer may be measured with a scanning electron microscope (SEM). Other methods and/or tools appreciated by one of ordinary skill in the art, even if not described in the present disclosure, may also be used.

The buffer layer 111*b* may basically play a role in improving mechanical strength of the multilayer electronic component 100' improving or withstand voltage characteristics of the multilayer electronic component 100'. The buffer layer 111*b* may have a dielectric composition similar to a dielectric composition of the dielectric layer 111*a*. For example, the buffer layer 111*b* may include a secondary phase including Zr and Y, as described above. As a result, a reliability improvement effect of the present disclosure may be more remarkable.

In FIG. 6, although a structure including two capacitance formation portions Ac1 and Ac2 and one buffer layer 111*b* is illustrated, but the present disclosure is not limited thereto, and there may be three or more capacitance formation portions Ac1 and Ac2, and two or more buffer layers 111*b*.

(Experimental Example)

Table 1 below illustrates a size of a main component powder, a sintering temperature, and amounts of first to fourth subcomponent elements. A unit of the size of the main component powder was nm, a unit of the sintering temperature was ° C., and the first to fourth subcomponents corresponded to the number of moles of the first to fourth subcomponent elements. For example, in sample number 1, 0.05 moles of the first subcomponent $Y_2O_3$ corresponds to 0.05 moles of Y, 0.32 moles of the second subcomponent $MnO_2$ corresponds to 0.32 moles of Mn, 0.32 moles of the third subcomponent $MgCO_3$ corresponds to 0.32 moles of Mg, and 0.32 moles of the fourth subcomponent $SiO_2$ corresponds to 0.32 moles of Si.

As the main component powder, CSZT-based powders having an average particle size of about 150 nm were used. A slurry were prepared by using zirconia beads as a mixing/dispersing medium, mixing raw material powders containing the subcomponent elements corresponding to compositions specified in Table 1 and the main component CSZT-based powders, together with an ethanol/toluene solvent and a dispersant, milling the mixture for 7 hours, and then additionally milling the mixture with a binder, for 1 hour. The slurry thus prepared was used to manufacture ceramic green sheets having a thickness of 0.1 μm to 3 μm using a sheet manufacturing molding machine. Thereafter, a nickel internal electrode pattern was printed on the ceramic green sheets. A cover portion was manufactured by stacking 20 or more layers of sheets for the cover portion, and the ceramic green sheets on which the internal electrode patterns were printed in a total of 20 or more layers were stacked and pressed to form a ceramic stack body, which was then cut into chips of a size of 0201 (length×width: 2.0 mm×1.0 mm) using a cutter. After the manufactured chips were calcined, the chips sintered under conditions of maintaining a temperature at 1300° C. or lower for 10 hours or less in a reducing atmosphere of 10% $H_2$ or higher/30% $N_2$ or higher ($H_2/N_2$ atmosphere), and then reoxidized in an $N_2$ atmosphere of 1000° C. or lower for 10 hours. The sintered chips were dipped with a Cu paste and subjected to electrode sintering to complete external electrodes, to prepare sample chips.

chips was $10^8\Omega$ or higher, it was evaluated as excellent (○), when the insulation resistance was $10^5\Omega$ or higher but less than $10^8\Omega$, it was evaluated as fair (Δ), and when the insulation resistance was less than $10^5\Omega$, it was evaluated as poor (x).

Reliability evaluation was conducted using accelerated life evaluation (HALT), and for 40 sample chips per sample number, a voltage of 100 V was applied at 125° C. or higher to measure the time until failure occurred, and an average time (mean time to failure (MTTF)) was calculated. Thereafter, when MTTF of all of the sample chips was 50,000 hours or more, it was evaluated as excellent (O), when the MTTF was 10,000 hours or more but less than 50,000 hours, it was evaluated as fair (A), and when the MTTF was less than 10,000 hours, it was evaluated as poor (x).

TABLE 2

| Sample No. | Area Ratio (%) | IR Evaluation | Reliability Evaluation |
|---|---|---|---|
| 1 | 0.5 | ○ | Δ |
| 2 | 1.0 | ○ | Δ |
| 3 | 1.5 | ○ | ○ |
| 4 | 2.0 | ○ | ○ |
| 5 | 2.5 | ○ | ○ |
| 6 | 3.0 | ○ | ○ |
| 7 | 3.5 | ○ | ○ |
| 8 | 4.0 | ○ | ○ |
| 9 | 4.5 | ○ | ○ |
| 10 | 5.0 | ○ | ○ |
| 11 | 6.0 | Δ | Δ |
| 12 | 9.0 | x | x |

Referring to sample numbers 1 to 10 in Table 2, when the ratio of the area occupied by the secondary phase to the total area of the dielectric layer in the 10 μm×10 μm region was 5% or less, it can be confirmed that insulation resistance of the sample chips was excellent. Referring to sample numbers 11 and 12, it can be confirmed that insulation resistance was reduced when the ratio of the area occupied by the secondary phase exceeded 5%.

TABLE 1

| Sample No. | Powder Size (nm) | Sintering Temp. (° C.) | 1st Subcomponent (mol) $Y_2O_3$ | 2nd Subcomponent (mol) $MnO_2$ | 3rd Subcomponent (mol) $MgCO_3$ | 4th Subcomponent (mol) $SiO_2$ |
|---|---|---|---|---|---|---|
| 1 | 150 | 1300 | 0.00 | 0.33 | 0.33 | 0.33 |
| 2 | 150 | 1300 | 0.05 | 0.32 | 0.32 | 0.32 |
| 3 | 150 | 1300 | 0.10 | 0.30 | 0.30 | 0.30 |
| 4 | 150 | 1300 | 0.15 | 0.28 | 0.28 | 0.28 |
| 5 | 150 | 1300 | 0.20 | 0.27 | 0.27 | 0.27 |
| 6 | 150 | 1300 | 0.25 | 0.25 | 0.25 | 0.25 |
| 7 | 150 | 1300 | 0.30 | 0.23 | 0.23 | 0.23 |
| 8 | 150 | 1300 | 0.35 | 0.22 | 0.22 | 0.22 |
| 9 | 150 | 1300 | 0.40 | 0.20 | 0.20 | 0.20 |
| 10 | 150 | 1300 | 0.45 | 0.18 | 0.18 | 0.18 |
| 11 | 150 | 1300 | 0.50 | 0.17 | 0.17 | 0.17 |
| 12 | 150 | 1300 | 0.60 | 0.13 | 0.13 | 0.13 |

In Table 2 below, an area ratio (%) corresponds to, when observing a 10 μm×10 μm region of a capacitance formation portion located in a central portion of a cross section of the body in the first and second directions, cut from a center of the body in the third direction, a ratio of an area of a secondary phase existing in the 10 μm×10 μm region to a total area of a dielectric layer existing in the 10 μm×10 μm region.

Insulation resistance (IR) was written as insulation resistance values measured at room temperature for each of 10 sample chips. When insulation resistance of all of the sample Referring to sample numbers 1 to 10, it can be confirmed that reliability evaluation was satisfactory, and in particular, when the ratio of the area occupied by the secondary phase was 1.5% or more and 5% or less, it can be confirmed that reliability of the sample chips was excellent.

Sample number 12 was poor in both insulation resistance and reliability evaluation. In addition, sample number 11 was found to have average results in both insulation resistance and reliability evaluation, which were inferior to sample numbers 1 and 2, which had good insulation resistance evaluation results and average reliability evaluation results.

The present disclosure is not limited by the embodiments and accompanying drawings, but is intended to be limited by the appended claims. Therefore, various forms of substitution, modification, and change will be possible by those skilled in the art in the scope of the technical spirit of the present disclosure described in the claims, and this will also be said to fall in the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

As one of various effects of the present disclosure, a multilayer electronic component having excellent high-temperature reliability and moisture-resistant reliability may be provided.

As one of various effects of the present disclosure, a multilayer electronic component having excellent insulation resistance may be provided.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:

a body including a dielectric layer and an internal electrode alternately disposed with the dielectric layer; and an external electrode disposed on the body;

wherein the dielectric layer includes secondary phases including Zr and Y, and among the secondary phases included in the dielectric layer, a numerical ratio of first secondary phases that contact the internal electrode is 70% or more.

2. The multilayer electronic component of claim 1, wherein the body comprises a capacitance formation portion in which the dielectric layer and the internal electrode are alternately disposed in a first direction, and a cover portion disposed on both surfaces of the capacitance formation portion opposing in the first direction, wherein the capacitance formation portion includes a 10 μm×10 μm region in which the numerical ratio is 70% or more.

3. The multilayer electronic component of claim 2, wherein a number of the first secondary phases contacting the internal electrode in the 10 μm×10 μm region is 5 or more.

4. The multilayer electronic component of claim 2, wherein a ratio of an area occupied by the secondary phases to a total area of the dielectric layer in the 10 μm×10 μm region is 5% or less.

5. The multilayer electronic component of claim 4, wherein the dielectric layer further comprises a first subcomponent element, wherein the first subcomponent element includes a rare earth element, wherein the rare earth element Y.

6. The multilayer electronic component of claim 5, wherein the dielectric layer further comprises a second subcomponent element, wherein the second subcomponent element includes Mn.

7. The multilayer electronic component of claim 6, wherein the dielectric layer further comprises a third subcomponent element, wherein the third subcomponent element includes Mg.

8. The multilayer electronic component of claim 7, wherein the dielectric layer further comprises a fourth subcomponent element, wherein the fourth subcomponent element includes Si.

9. The multilayer electronic component of claim 1, satisfies $S_{Zr}>R_{Zr}$ and $S_Y>R_Y$:

where $S_{Zr}$ is an atomic percentage of Zr included in the secondary phases, $S_Y$ is an atomic percentage of Y included in the secondary phases, $R_{Zr}$ is an atomic percentage of Zr included in a remaining region of the dielectric layer excluding the secondary phases, and $R_Y$ is an atomic percentage of Y included in the remaining region of the dielectric layer excluding the secondary phases.

10. The multilayer electronic component of claim 1, wherein $S_{zr}$ is 0.1 at& or more and 50 at % or less, and $S_Y$ is 0.1 at % or more and 10 at % or less, where $S_{Zr}$ is an atomic percentage of Zr included in the secondary phases and $S_Y$ is an atomic percentage of Y included in the secondary phases.

11. The multilayer electronic component of claim 1, wherein the dielectric layer comprises a main component having a perovskite structure represented by a general formula $ABO_3$, wherein A includes one or more of Ca and Sr, and B includes Zr.

12. The multilayer electronic component of claim 11, wherein the dielectric layer further comprises a first subcomponent element, wherein the first subcomponent element includes a rare earth element, wherein the rare earth element includes one or more of Y, Dy, Tb, Gd, Ce, Nd, La, and Yb.

13. The multilayer electronic component of claim 11, wherein the dielectric layer further comprises a second subcomponent element, wherein the second subcomponent element includes one or more of Mn, V, Cr, Fe, Co, Ni, Cu, Co, and Zn.

14. The multilayer electronic component of claim 11, wherein the dielectric layer further comprises a third subcomponent element, wherein the third subcomponent element includes Mg.

15. The multilayer electronic component of claim 11, wherein the dielectric layer further comprises a fourth subcomponent element, wherein the fourth subcomponent element includes Si.

16. The multilayer electronic component of claim 1, wherein the body comprises a capacitance formation portion in which the dielectric layer and the internal electrode are alternately disposed in a first direction, and a cover portion disposed on both surfaces of the capacitance formation portion opposing in the first direction, wherein the cover portion includes the secondary phases.

17. The multilayer electronic component of claim 16, wherein a ratio of an area occupied by the secondary phases in the cover portion is higher than a ratio of an area occupied by the secondary phases in the dielectric layer.

18. The multilayer electronic component of claim 1, wherein the body comprises a plurality of capacitance formation portions in which the dielectric layer and the internal electrode are alternately disposed in a first direction, and a buffer layer disposed between adjacent capacitance formation portions, wherein the buffer layer includes the secondary phases and has a thickness thicker than a thickness of the dielectric layer.

19. The multilayer electronic component of claim 1, wherein the dielectric layer comprises a plurality of dielectric grains, wherein an average diameter of the plurality of dielectric grains is 300 nm to 500 nm.

* * * * *